(12) United States Patent
Waibel et al.

(10) Patent No.: US 7,493,702 B2
(45) Date of Patent: Feb. 24, 2009

(54) TILT CONTROL METHOD

(75) Inventors: Reinhard Waibel, Berneck (CH); Sasha Lukic, Buchs (CH); Heinz Kousek, Feldkirch (AT); Manfred Ammann, Lauterach (AT)

(73) Assignee: Hilti Aktiengesellschaft, Schaan (LI)

( * ) Notice: Subject to any disclaimer, the term of this patent is extended or adjusted under 35 U.S.C. 154(b) by 167 days.

(21) Appl. No.: 11/580,813

(22) Filed: Oct. 13, 2006

(65) Prior Publication Data
US 2007/0085028 A1    Apr. 19, 2007

(30) Foreign Application Priority Data
Oct. 17, 2005   (DE) .................. 10 2005 000 140

(51) Int. Cl.
*G01C 9/06*   (2006.01)
(52) U.S. Cl. .................. 33/366.11; 33/366.14; 33/290; 33/286; 702/154
(58) Field of Classification Search .................. 33/365, 33/366.11, 366.14–366.19, 366.23–366.27, 33/369, 377, 379, 384, 385, 282, 283, 286, 33/290, 291, DIG. 21; 340/689, 686.2; 702/154
See application file for complete search history.

(56) References Cited

U.S. PATENT DOCUMENTS

| | | | | |
|---|---|---|---|---|
| 4,136,962 A | * | 1/1979 | Brouwer et al. | 356/248 |
| 5,636,018 A | * | 6/1997 | Hirano et al. | 356/248 |
| 5,689,330 A | * | 11/1997 | Gerard et al. | 356/138 |
| 5,946,087 A | * | 8/1999 | Kasori et al. | 356/249 |
| 6,043,874 A | * | 3/2000 | Detweiler | 356/139.03 |
| 6,144,308 A | * | 11/2000 | Dunne | 340/689 |
| 6,625,895 B2 | * | 9/2003 | Tacklind et al. | 33/286 |
| 6,763,595 B1 | * | 7/2004 | Hersey | 33/286 |
| 6,892,464 B2 | * | 5/2005 | Ohtomo et al. | 33/290 |
| 6,988,319 B2 | * | 1/2006 | Hung | 33/291 |
| 7,134,211 B2 | * | 11/2006 | Bascom et al. | 33/286 |
| 7,228,635 B2 | * | 6/2007 | Jian et al. | 33/291 |
| 7,322,118 B2 | * | 1/2008 | Huang et al. | 33/366.23 |

FOREIGN PATENT DOCUMENTS

| | | |
|---|---|---|
| EP | 1524495 A1 | 4/2005 |
| WO | WO8400554 A1 | 2/1984 |
| WO | WO0128820 A2 | 4/2001 |

\* cited by examiner

*Primary Examiner*—G. Bradley Bennett
*Assistant Examiner*—Amy Cohen Johnson
(74) *Attorney, Agent, or Firm*—Abelman, Frayne & Schwab

(57) ABSTRACT

A tilt control method includes a tilt control step for automatic control of the tilt ($\alpha$) of a tilt device (1) by at least one electronic tilt sensor (2) based on gravitational force (G) and by a tilt control device (5), and a sensor test step which is carried out automatically at a test initiation signal, and in case of a malfunction, supplies an error signal ($\Theta$) which prevents the tilt control step from being carried out.

10 Claims, 1 Drawing Sheet

TILT CONTROL METHOD

BACKGROUND OF THE INVENTION

1. Field of the Invention

The present invention relates to a tilt control method, particularly for self-leveling construction lasers with tilt sensors such as tubular spirit levels based on gravitational force.

2. Description of the Prior Art

Tilt generally denotes an inclined position or deviation of an object from the normal position of rest or equilibrium which is determined by the acceleration due to gravity. Below, the use of a liquid level which, without limiting the subject matter, will be described more fully as an example of tilt sensors based on gravitational force.

The liquid level (tubular spirit level, spherical spirit level) that is commonly used in measurement technique is a hollow glass body or hollow plastic body filled with a liquid and a gas bubble. The hollow space in which the liquid and gas bubble are located is slightly curved with a defined radius on the upper side so that the gas bubble always floats to the highest point. Electronic spirit levels are tilt sensors which are based on gravitational force and which gauge the tilt measurements electrically or electro-optically. The measurement function of the tilt measurements is usually strictly linear to the tilt angle, and the rise of the measurement function is the sensitivity.

For a variety of reasons, actual electronic spirit levels can have inaccuracies and malfunctions which overlap, e.g., hysteresis effect in the movement of the gas bubble or in the electronic measurement detection, change in curvature of the hollow space, or accumulation of dirt particles at the hollow space, temperature-related expansion of the gas bubble, loss of liquid over time, and so on. When used for its prescribed purpose, an electronic spirit level for automatic tilt control of a tilt device with a tilt control algorithm that forms a control loop with a tilt control device that is controlled by this algorithm, is additionally subjected to the hysteresis effects and nonlinearities of both the tilt control device and the tilt control algorithm.

Particularly in self-leveling construction lasers, e.g., according to EP1524495, the accuracy and reliability of the automatically adjusted tilt of projected beams or planes should meet strict requirements and must also be sufficiently robust under the harsh environmental conditions common in the building industry.

According to EP0126083, a tilt monitoring and alarm system has a tubular spirit level with measurement based on capacitance. For preventing false alarms, a threshold detector forms hysteresis in the measurement arm.

According to WO0128820, a tilt sensor for vehicles, which is based on tubular spirit levels, is connected to a microcontroller which calculates the tilt and the acceleration from the detected position of the gas bubble using an algorithm.

An object of the present invention is to increase the reliability of tilt control methods with tilt sensors based on gravitational force.

SUMMARY OF THE INVENTION

This and other objects of the present invention, which will become apparent hereinafter, are achieved with a tilt control method that includes a tilt control step for automatic control of a tilt of a tilt element using at least one electronic tilt sensor based on gravitational force, and a tilt control device, and a sensor test step which is carried out automatically upon a test initiation signal and, in case of malfunction, sends an error signal which prevents the tilt control step from being carried out.

By preventing the execution of the tilt control step in case of an automatically detected malfunction, the tilt control method cannot be implemented in a purposeful way. In this way, an erroneous tilt control is prevented. This obvious inability to operate alerts the user directly about any malfunction.

In an advantageous manner, the recovery time needed until automatic leveling is detected during the tilt control step, and the error signal is triggered when a time limit is exceeded.

The sensor test step is advantageously carried out automatically during the normal functional use of the tilt device, particularly in the leveled state, so that the sensor test step is carried out without impairing function.

The sensor test step advantageously includes a linearity test step in which the tilt of the tilt device is changed infinitesimally in a measuring step with the tilt control device, and the associated change in the measured value of the tilt measurement is determined. The infinitesimal sensitivity is advantageously determined in a subsequent comparison step from the quotient of the measurement change to the tilt change, and is compared with a given reference sensitivity of the tilt sensor. The error signal is generated in case of an impermissible deviation. An impermissible deviation occurs in case the infinitesimal sensitivity is substantially too small or substantially too large, which indicates, e.g., an impermissible internal friction of the gas bubble in the hollow space. Instead of the infinitesimal sensitivity, it is also possible to compare only the change in the measured value as such to a given reference range.

In an advantageous manner, the measurement step is repeated multiple times, and the change in the measurement value and, optionally, the change in tilt are accumulated so that stochastic errors, e.g., caused by external vibrations, and unfounded error signals are prevented.

The sensor test step is advantageously carried out point by point proceeding from the actual tilt with infinitesimal changes in tilt in both directions so that a directional dependency of the linearity of the control loop including the measured value function is check at the actual tilt. This point-by-point sensor test step can be carried out repeatedly, particularly automatically, during functional use, without interfering with use, particularly when the infinitesimal tilt changes are smaller than the given reference tilt resolution of the tilt control algorithm.

A series of sensor test steps which are carried out with different tilts which are advantageously changed in a strictly monotonous manner, advantageously includes the entire sensitive tilt range of the tilt sensor so that the linearity of the control loop, including the measured value function of the tilt sensor, is checked in its entirety.

The series of sensor test steps is advantageously carried out over the entire sensitive tilt range of the tilt sensor from both directions so that a directional dependency of the linearity of the control loop, including the measured value function of that of the tilt sensor, is checked in its entirety. This integral sensor test step can be carried out in particular automatically during a preceding initialization step of the tilt control method.

A tilt control method of the type described above is advantageously used in an electronic tilt sensor which is based on gravitational force and is constructed as a tubular spirit level so that high measuring accuracy is achieved.

A tilt control method of this type is advantageously used with a tilt control algorithm of a computing device of a construction laser so that its tilt stability and reliability is increased.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show.

DETAILED DESCRIPTION OF THE PREFERRED EMBODIMENT

Figure 1:
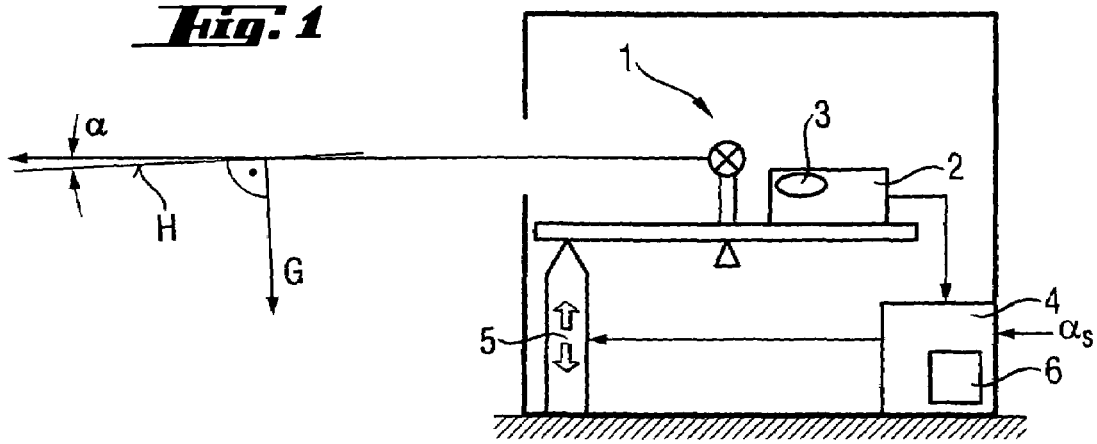
FIG. 1 a schematic view of the tilt control.

According to FIG. 1, the tilt $\alpha$ of a tilt device 1 in the form of a laser unit of a construction laser that includes a tilt sensor 2 in the form of an electronic tubular spirit level with a gas bubble 3. The tilt sensor 2 is arranged at the construction laser and is based on gravitational force G, is automatically adjusted to a given reference tilt a, relative to the horizontal H in an electronic control loop by a computing device 4 in the form of a microcontroller and tilt control device 5 in the form of a servomotor. The calculation device 4 contains a programmed tilt control algorithm 6.

Figure 2:
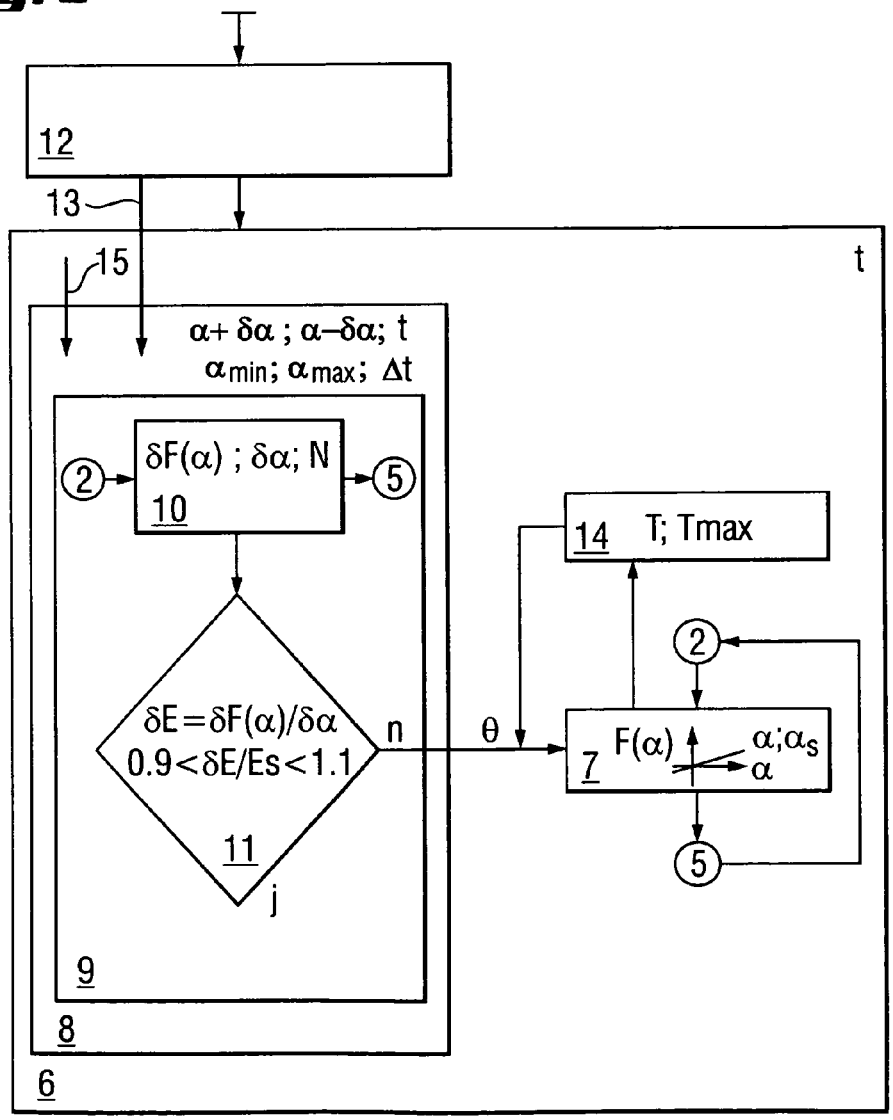
FIG. 2 a tilt control algorithm.

According to FIG. 2, the tilt control algorithm 6 which is suitable for carrying out the tilt control method with the computing device 4, (FIG. 1) includes a tilt control step 7 for automatically controlling the tilt $\alpha$ to the reference tilt $\alpha_S$ predetermined by the user, and a sensor test step 8. The sensor test step 8 is carried out automatically when a test initiation step 15 is initiated by the computing device 4 (FIG. 1), regularly during normal use and, in case of a malfunction, supplies an error signal $\Theta$ which prevents the tilt control step 7 from being carried out, whereby functional use of the tilt control algorithm 6 becomes impossible, and the user is alerted directly about any malfunction. The sensor test step 8 includes a linearity test step 9 in which the tilt $\alpha$ of the tilt device 1 (FIG. 1) is changed infinitesimally by $\delta\alpha$ in a measurement step 10 by the proportionally controlled tilt control device 5 (FIG. 1), and the associated measured value change $\delta F\alpha$ of the tilt measurement value $F\alpha$ is determined. The measurement step is repeated N times, and the measured value change $\delta F\alpha$ and the tilt change $\delta\alpha$ are accumulated. In a subsequent comparison step 11, the infinitesimal sensitivity $\delta E$ is determined from the quotient of the measured value change $\delta F\alpha$ to the controlled tilt change $\delta\alpha$ and is compared with a given integral reference sensitivity $E_S$ of the tilt sensor 2 (FIG. 1), wherein a sensitivity range $0.9 < \delta E/E_S < 1.1$ is permissible. In case of an impermissible deviation, the error signal $\Theta$ is generated. During functional use of the tilt device 1 in the self-leveled state, the sensor test step 8 is carried out periodically after a time period $\Delta t$ once per minute point by point, proceeding from the actual tilt $\alpha$ in both directions with infinitesimal tilt changes $\delta\alpha$ which are quantitatively less than the given reference tilt resolution of the tilt control algorithm 6. Further, during an initialization step 12 which precedes the tilt control algorithm, a series of sensor test steps 8, which are implemented at different tilts $\alpha$ which change in a strictly monotonous manner and which comprise the entire sensitive tilt range from $\alpha_{min}$ to $\alpha_{max}$ of the tilt sensor 2, is carried out from both directions upon a test command 13. In addition, in a time measurement step 14, the regulating time period T, which is required until automatic leveling takes place, is detected during every tilt control step 7, and the error signal $\Theta$ is triggered when a time limit $T_{max}$ is exceeded.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A method of automatically controlling tilt ($\alpha$) of a tilt device (1), comprising the steps of:
   providing at least one electronic tilt sensor (2) based on a gravitational force (G);
   providing a tilt control device (5) for controlling the tilt ($\alpha$);
   carrying out an automatic tilt control step (7) of the tilt ($\alpha$) with the tilt control device (5) in accordance with signals generated by the electronic tilt sensor (2);
   carrying out a sensor test step (8) in response to a test initiation signal (15);
   performing a linearity test step in which the tilt of the tilt device (1) is changed infinitesimally in a measurement step (10) by the tilt control device (5);
   performing a subsequent comparison step (11) for determining and comparing the associated measured value change ($\delta F\alpha$) of the tilt measurement value ($F\alpha$); and
   preventing the automatic tilt control step (7) from being carried out in response to an error signal ($\Theta$) generated upon detecting a malfunction during the sensor test step.

2. A tilt control method according to claim 1, further comprising the steps of:
   detecting, during the tilt control step (7), a recovery time (T) required until automatic leveling occurs; and
   initiating the error signal ($\Theta$) when a time limit ($T_{max}$) is exceeded.

3. A tilt control method according to claim 1, wherein the sensor test step (8) is carried out automatically during normal functional use of the tilt device (1).

4. A tilt control method according to claim 1, further comprising the step of:
   generating the error signal ($\Theta$) in case that an impermissible deviation of the tilt measurement value ($F\alpha$) occurs.

5. A tilt control method according to claim 4, wherein the measurement step (10) is repeated multiple times, and the measured value change ($\delta F\alpha$) is accumulated.

6. A tilt control method according to claim 1, wherein the sensor test step (8) is carried out point by point, proceeding from the actual tilt ($\alpha$) with infinitesimal tilt changes ($\delta\alpha$) in opposite directions.

7. A tilt control method according to claim 1, wherein a series of sensor test steps (8), which are implemented at different tilts ($\alpha$), comprises an entire sensitive tilt range of the tilt sensor (2).

8. A tilt control method according to claim 7, wherein the series of sensor test steps (8) is carried out from both directions.

9. A tilt control method according to claim 1, wherein the step of providing at least one electronic tilt sensor (2) includes providing a tubular spirit sensor for use as the at least one electronic tilt sensor (2).

10. A tilt control method according to claim 1, wherein the tilt device (1) is formed as a construction laser, and wherein the method is implemented in a tilt control algorithm (6) of a computing device (4) of the construction laser.

* * * * *